May 28, 1968     T. J. GAUDYN     3,385,162

HIGH EFFICIENCY MIRROR PROJECTION SYSTEM

Filed Feb. 10, 1966

United States Patent Office 3,385,162
Patented May 28, 1968

3,385,162
HIGH EFFICIENCY MIRROR PROJECTION
SYSTEM
Tad J. Gaudyn, Box 22568, U.P.R. Station, Rio Piedras,
San Juan, Puerto Rico 00928
Filed Feb. 10, 1966, Ser. No. 526,626
2 Claims. (Cl. 88—26)

ABSTRACT OF THE DISCLOSURE

A high efficiency mirror projection system including a holder for a subject image to be projected, a plurality of light sources for illuminating the subject image, an image magnifying lens, an object lens, and a concave spherical mirror.

This invention relates generally to the field of optical projectors, and more particularly to an improved mirror projection system particularly suited for use as an advertising display, or the simultaneous viewing of opaque or transparent subjects by a plurality of persons.

It is among the principal objects of the present invention to provide a projection system of the class described which may be effectively operated at very low projection light levels, whereby the continuous projection of a single subject over a long period of time may be accomplished without damage to said subject.

Another object of the invention lies in the provision of a projection system of the class described which employs a concave mirror as a viewed projection screen, wherein high brilliance of the projected image is obtained without resort to high light intensity.

Still another object of the invention lies in the provision of an improved projection system possessed of the above advantages, in which the cost of fabrication may be of a relatively low order, with consequent wide sale, distribution and use.

These objects, as well as other incidental ends and advantages, will more clearly appear in the progress of the following disclosure, and be pointed out in the appended claims.

In the drawing, to which reference will be made in the specification, similar reference characters have been employed to designate corresponding parts throughout the several views.

Figure 1:
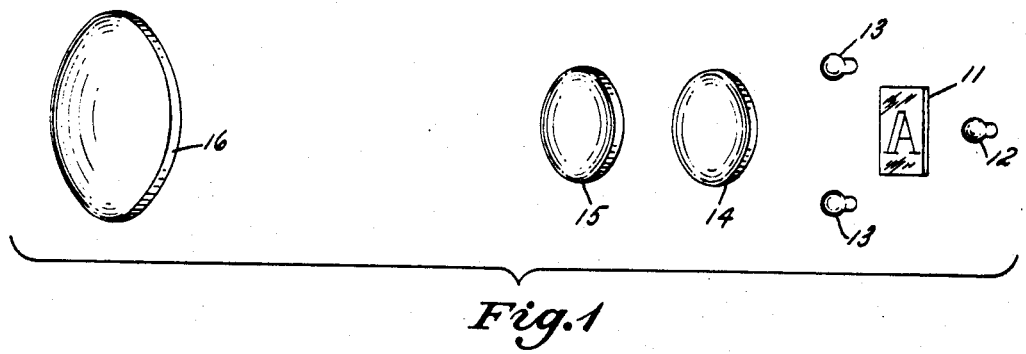
FIGURE 1 is a schematic view in perspective illustrating an embodiment of the invention.

In accordance with the invention, FIGURE 1 discloses the principal components of which a working embodiment is comprised, including means 11 for holding a subject image to be projected, first lighting means 12, second lighting means 13, image magnifying means 14, an objective lens 15, and a concave spherical mirror 16.

The means 11 may be in the form of a slide carrier (not shown) of a type well known in the art, the first lighting means 12 being disposed in back of the means 11, and the second lighting means 13 being disposed forwardly thereof. By selective use of either of the means 12–13, it is possible to project images from diapositive transparencies, or from opaque subject matter wherein reflected rather than transmitted light is employed. The magnifying means 14 is in the form of a positive lens positioned a distance from the means 11 less than the focal length thereof. The objective lens 15, although illustrated as a simple lens may be of well known type having a plurality of elements therein for effecting astigmatic and chromatic correction. The concave spherical mirror 16 is of effective focal length substantially greater than that of the objective lens, depending upon the degree of magnification desired.

Figure 2:
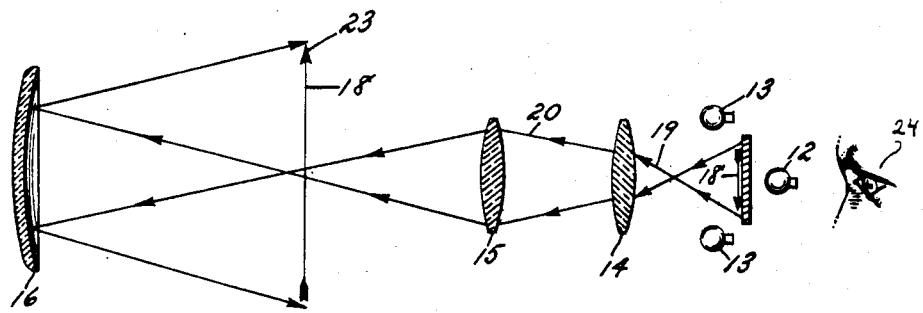
FIGURE 2 is a simple schematic side elevational view thereof, showing the passage of light rays between the various components.

Referring to FIGURE 2, the projected image 18 is for purposes of simplicity displayed as an arrow, and is positioned in reverse within the means 11, so that the normal image reversal will occur. The light rays 19 pass through the magnifying means 14, which spreads the same as indicated by reference character 20 prior to passing through the objective lens 15. Light rays 20 travelling toward the mirror 16 cause a magnification, by virtue of the fact that the mirror is situated a distance from the objective lens greater than twice the focal length of said lens. Owing to the large focal length of the mirror 16, received rays are reflected in a divergent pattern to form an enlarged erected real image at 23.

Owing to the inherent distortion of the system, viewing of this image must be confined to points laterally spaced only a short distance from the principal axis thereof, as indicated by the location of the viewing point 24. Distortion is also limited by the fact that the magnifying means 14 serves as an optical stop.

Figure 3:
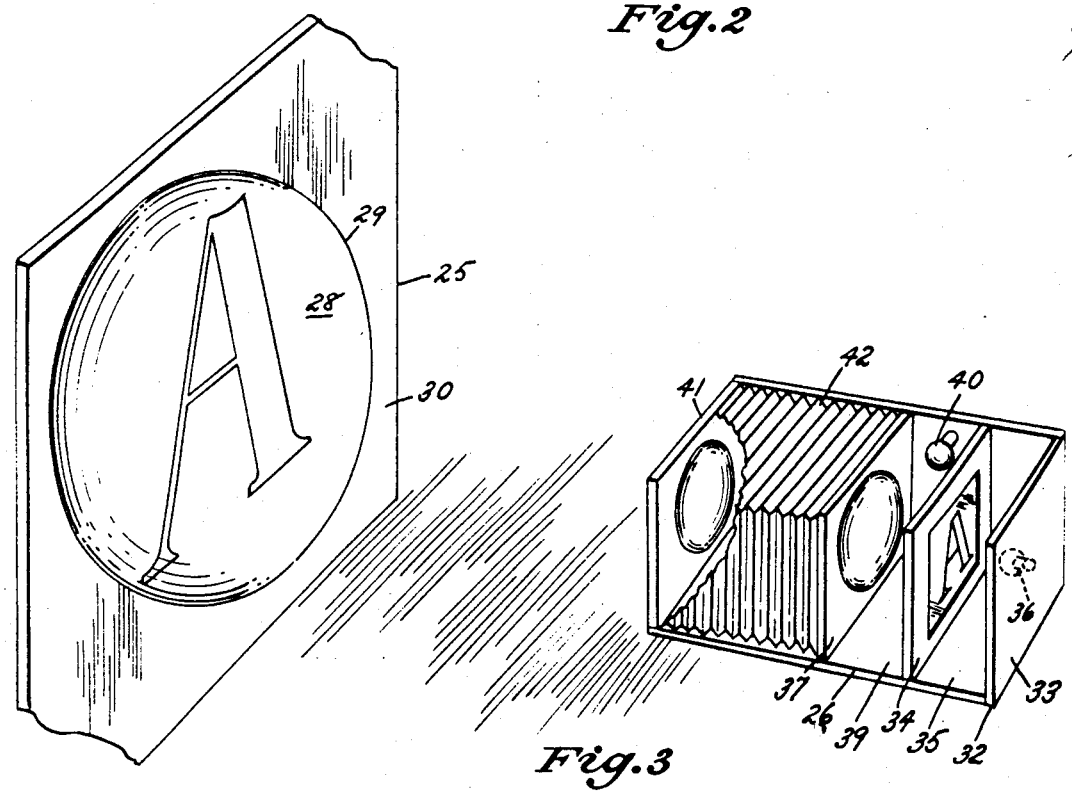
FIGURE 3 is a fragmentary view in perspective of an actual embodiment of the invention.

Referring to FIGURE 3, there is illustrated a simple embodiment of the invention which comprises a mirror support element 25 and a projector element 26. The support element 25 includes the concave mirror 28, the periphery 29 of which is supported within a corresponding opening in a generally rectangularly shaped supporting member 30.

The projector element 26 includes a box-like enclosure 32, an end wall 33, and a subject matter holding means 34 which defines a first chamber 35 in which the first light means 36 is disposed. A lens support member 37 forms a second chamber 39 with the means 34, and the second light means 40 is disposed therein for use with opaque projection material. A second objective lens support member 41 is interconnected by adjustable bellows means 42 in well known manner to permit the focusing of the objective lens upon the magnifying means.

I wish it to be understood that I do not consider the invention limited to the precise details of structure shown and set forth in this specification, for obvious modifications will occur to those skilled in the art to which the invention pertains.

I claim:
1. An optical mirror projection system comprising: a light source, support means for supporting an image to be projected disposed in a location to be illuminated by said light source, positive lens means having a given focal length, and positioned in adjustment with respect to said image supporting means a distance less than said focal length; an objective lens receiving an image from said positive lens, a concave mirror receiving an image from said projection lens and forming an enlarged real image between said mirror and said objective lens.

2. Structure in accordance with claim 1 in which said mirror has an effective focal length greater than that of said projection lens.

References Cited

UNITED STATES PATENTS 2,344,263   3/1944   Perkins _____ 88—24
2,786,387   3/1957   Belok.

FOREIGN PATENTS 405,894   11/1924   Germany.

NORTON ANSHER, *Primary Examiner.*
R. M. SHEER, *Assistant Examiner.*